US006928502B2

(12) United States Patent
Monteiro

(10) Patent No.: US 6,928,502 B2
(45) Date of Patent: Aug. 9, 2005

(54) METHOD AND APPARATUS FOR PROCESSING INTERRUPTS AT DYNAMICALLY SELECTABLE PRIORITIZATION LEVELS

(75) Inventor: Anand C. Monteiro, San Diego, CA (US)

(73) Assignee: VIA Telecom Co., Ltd., Grand Cayman (KN)

( * ) Notice: Subject to any disclaimer, the term of this patent is extended or adjusted under 35 U.S.C. 154(b) by 278 days.

(21) Appl. No.: 10/356,130

(22) Filed: Jan. 31, 2003

(65) Prior Publication Data

US 2004/0153596 A1 Aug. 5, 2004

(51) Int. Cl.[7] .................. G06F 13/26; G06F 13/14; G06F 9/00
(52) U.S. Cl. ............... 710/265; 710/260; 710/262; 710/305
(58) Field of Search ............... 710/260–262, 710/264.2, 65, 268, 40, 49, 305; 718/103; 340/825.5

(56) References Cited

U.S. PATENT DOCUMENTS

| 5,083,261 A | * | 1/1992 | Wilkie ............... 710/265 |
| 5,283,904 A | * | 2/1994 | Carson et al. ......... 710/266 |
| 5,781,187 A | * | 7/1998 | Gephardt et al. ...... 710/309 |
| 6,295,573 B1 | * | 9/2001 | Bailey et al. ......... 710/260 |
| 6,631,394 B1 | * | 10/2003 | Ronkka et al. ........ 718/100 |

OTHER PUBLICATIONS

"Multiple invariant system design for fault–tolerant real–time applications" by Yen, I.L. (abstract only) Publication date: Feb. 1–2, 1996.*
"Fast context switching by hierarchical task allocation and reconfigurable cache" by Tanaka, K. (abstract only) Publication Date: Jul. 17, 2003.*

* cited by examiner

Primary Examiner—Gopal C. Ray
(74) Attorney, Agent, or Firm—Martin J. Jaquez, Esq.; Jaquez & Associates

(57) ABSTRACT

A method and apparatus are described by which interrupts from a source may be processed at a dynamically selectable level of priority. A system that has at least two different interrupt request connections, and that responds to interrupts asserted on the different connections by processing interrupts at associated and corresponding different priority levels, is configured so that an interrupt asserted by a particular interrupt source is coupled to a particular one of the plurality of request connections that has been selected under software control. Selective coupling of interrupt source to interrupt request connection may be effected by providing a set of control bits associated with each particular interrupt source, the set consisting, for example, of one interrupt mask bit for each of the different selectable priorities. Control may optionally be provided to preclude simultaneous coupling of an interrupt source to incompatible interrupt request connections.

20 Claims, 4 Drawing Sheets

METHOD AND APPARATUS FOR PROCESSING INTERRUPTS AT DYNAMICALLY SELECTABLE PRIORITIZATION LEVELS

BACKGROUND OF THE INVENTION

1. Field of the Invention

This invention relates to computer systems, and particularly to those that provide a hardware mechanism for interrupting program execution.

2. Description of Related Art

Most microprocessors, and indeed more general computing systems, provide at least two different levels of interrupt priority, which may be referred to as High Priority and Low Priority. For simplicity, the description herein begins with a focus on systems having only two such levels of interrupt priority. Low Priority interrupts preempt the normal flow of microprocessor code execution, while High Priority interrupts preempt both the normal flow of code execution, as well as Low Priority interrupts.

Typically, events with a relatively low bandwidth, such as keyboard and mouse operations, are assigned to the Low Priority interrupt, while higher bandwidth events, which could include, for example, responses to USB buffering, MP3 buffering, or Graphics Cards, are assigned to the High Priority interrupt.

Interrupt sources are often pre-assigned to either Low or High interrupt connections as part of the integrated circuit (IC) fabrication process. Event priorities are therefore effectively "hard-wired" into many IC designs before software for the IC is fully developed. Pre-assignment of interrupt priorities can create system design problems, especially for interrupts that are not easily classified as high bandwidth or low bandwidth, or for interrupts that vary in classification.

For example, a UART requires a much higher bandwidth than does a keyboard (Low Priority Interrupt), but a significantly lower bandwidth than a Graphics Controller device (High Priority Interrupt). If a UART is assigned the same interrupt priority as the Graphics Controller device, there is a danger than the Interrupt Service Routine (ISR) associated with the Graphics Controller will not receive timely attention while a UART ISR is in progress. Conversely, if a UART interrupt is assigned the same interrupt priority as lower bandwidth devices, such as a keyboard, then the keyboard interrupt may prevent the UART ISR from receiving timely attention.

Because the prior art forces designers to prioritize interrupts at the time of IC manufacture, which creates potentially serious problems for software development, there is a need for an improved method and apparatus for controlling the assignment of interrupt priorities.

SUMMARY OF THE INVENTION

A method and apparatus for implementing interrupt request connections to a computer is disclosed.

One embodiment of the present invention is a method of enabling microprocessor interrupt source connections to have a selectable priority level. The method includes acts of servicing interrupts at first and second request connections according to corresponding first and second priorities, and of providing request control bits corresponding to a particular source connection and having a software-selectable state. The method also includes acts of responding to an interrupt request asserted at a particular source connection in accordance with the state of the control bits, asserting an interrupt at the first request connection if the control bits are in a first state, and asserting an interrupt at the second request connection if the control bits are in a different state.

Another embodiment of the present invention includes computer apparatus for providing an interrupt request input having a selectable priority level. The apparatus includes a first interrupt request connection for causing an interrupt service routine at a first priority level when presented with an appropriate interrupt request signal, and a second interrupt request connection for causing an interrupt service routine at a second priority level when presented with an appropriate interrupt request signal. The apparatus also includes an interrupt source connection, one or more control bits associated with the source connection, and logic to couple an interrupt from the interrupt source to the first request connection if the control bits are in a first state, and to couple the interrupt to the second request connection if the control bits are in a second state.

BRIEF DESCRIPTION OF THE DRAWINGS

Embodiments and details of the invention will be more readily understood by reference to the figures and associated explanation that are provided. Like reference numbers indicate like structure or function throughout.

DETAILED DESCRIPTION

Figure 1:
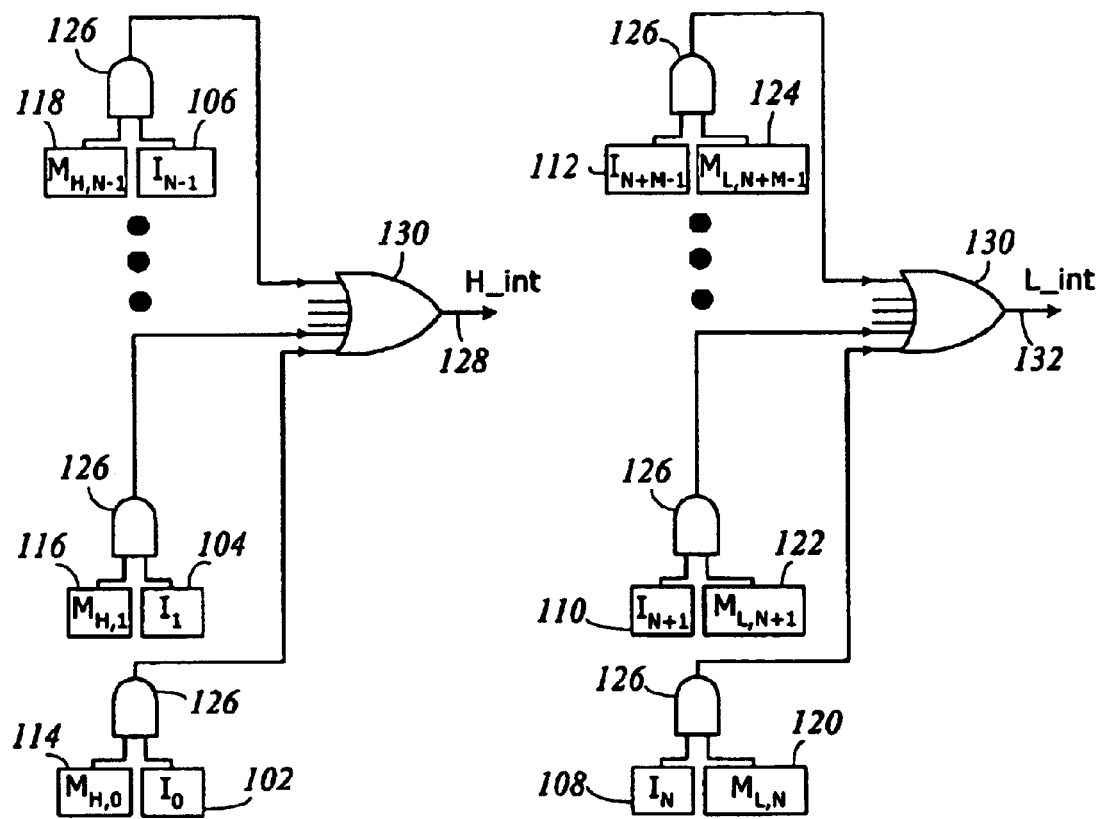
FIG. 1 is a block schematic diagram of generally conventional interrupt request connections.

FIG. 1 shows how interrupt sources are typically connected to High Priority and Low Priority interrupt pins of a generally conventional microprocessor. $I_K$ represents an interrupt source K. N high priority and M low priority interrupt source connections are indicated. The N high priority interrupt sources are represented by a first such source $I_0$ 102, a second high priority interrupt source $I_1$ 104, and a third such source $I_{N-1}$ 106. Similarly, the M low priority interrupt pins are represented by a first low priority interrupt source 108 labeled $I_N$, (the first interrupt following the last high priority interrupt $I_{N-1}$), a second low priority interrupt source 110 labeled $I_{N+1}$, and a last such source 112 labeled $I_{N+M-1}$. Thus, a total of N+M interrupt source connections are represented, the interrupt sources $I_K$ being distinguished by an index K ranging from 0 to N+M−1, inclusive.

Each interrupt source typically has an associated mask bit, represented here as high priority mask bits 114, 116 and 118 labeled $M_{H,0}$, $M_{H,1}$, and $M_{H,N-1}$ respectively, and by low priority mask bits 120, 122 and 124 labeled $M_{L,N}$, $M_{L,N+1}$, and $M_{L,N+M-1}$ respectively. These mask bits are typically disposed in registers that are controllable from the microprocessor address/data bus(es).

A mask bit enables or disables interrupts from the interrupt source associated with it by means of appropriate hardware logic, such as an AND gate 126. $M_{H,K}$ indicates a high-priority interrupt mask register bit K, while $M_{L,K}$ indicates a low priority interrupt mask register bit K. H_int indicates a connection to a high priority interrupt request connection of the microprocessor, and L_int indicates a connection to a low priority interrupt request connection of the microprocessor. When enabled (e.g., the corresponding mask bit set to one), an interrupt asserted by any of the high priority sources 102, 104, . . . 106 (e.g., by setting an interrupt assertion bit) will be coupled to a high priority interrupt pin 128 (H_int) (e.g., will cause H_int 128 to also be set). Such coupling may be effected by means of appropriate hardware logic, such as an OR gate 130. Appropriate logic similarly causes a low priority interrupt pin 132 (L_int) to be set as a result of setting any enabled low priority interrupt source bit.

As an example, one may connect a keyboard and mouse to the low priority interrupts $I_N$, $I_{N+1}$, while connecting USB and MP3 interrupts to the high priority interrupts $I_0$, $I_1$. In general one may have N high priority interrupts and M low priority interrupts, where N and M need not be equal, in a two priority-level system.

If any of the interrupt sources asserts an interrupt, and the corresponding mask register is enabled (e.g., set to "1"), then the interrupt will be coupled to the High Priority interrupt request connection 128 (H_int) or to the Low Priority interrupt request connection 132 (L_int) in accordance with the hardware logic, thus asserting the interrupt at the microprocessor. Consequently, the interrupt will be serviced by a software Interrupt Service Routine (ISR).

Figure 2:
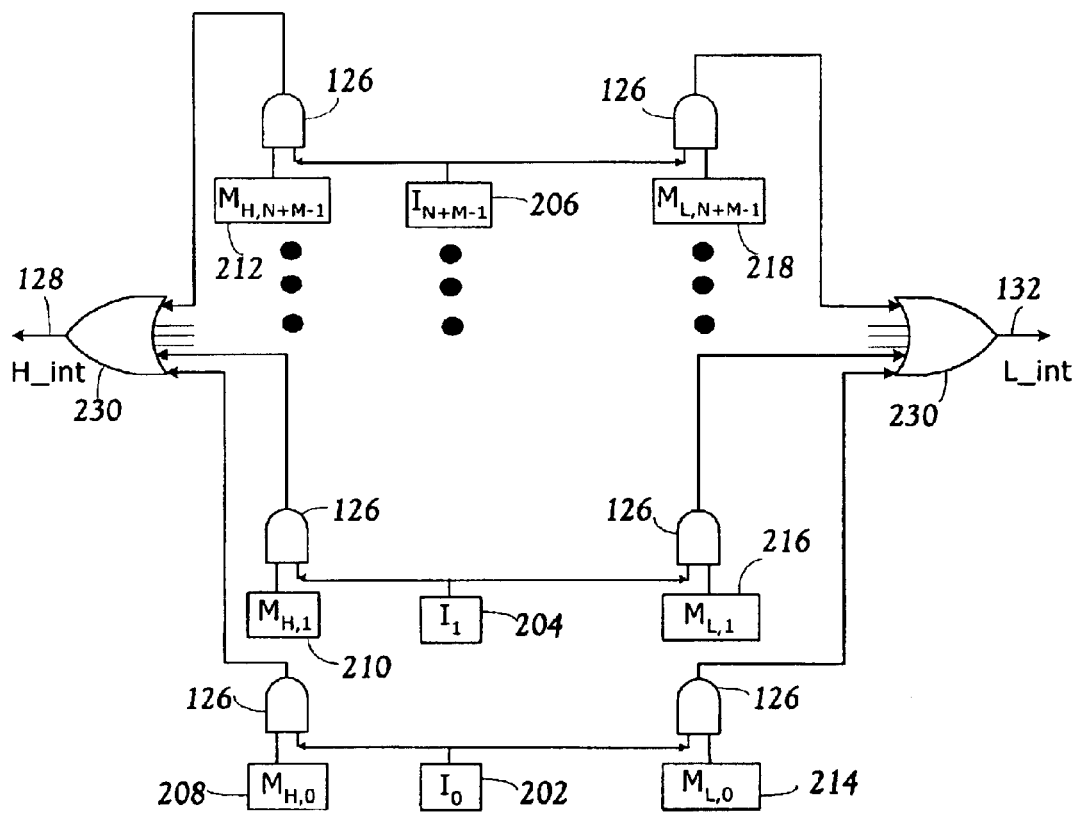
FIG. 2 is a block schematic diagram of interrupt request connection logic for dynamic interrupt priority selection.

Referring now to FIG. 2, the same general number (N+M) of interrupt source connections, ranging from a source 0 to a source N+M−1, is similarly indicated as in the circuit of FIG. 1. The N+M interrupt sources are represented in FIG. 2 by a first interrupt source connection $I_0$ 202, a second source $I_1$ 204, and a final source $I_{N+M-1}$ 206. As shown, interrupts generated at any of these interrupt sources may be selectably enabled under software control to cause an assertion of either the High Priority interrupt connection 128 (H_int), or the Low Priority interrupt connection 132 (L_int). Such software control may be provided, for example, by setting (under software control) the value of two mask bits associated with each interrupt source, a High Priority mask bit and a Low Priority mask bit.

In the embodiment shown in FIG. 2, the total of High Priority mask bits $M_{H,K}$ is indicated as N+M, and the total of Low Priority mask bits $M_{L,K}$ is also indicated as N+M, resulting in a total number of mask bits of 2(N+M). These mask bits constitute control bits that enable selecting a priority level for each of the N+M interrupt request connections. The circuit shown in FIG. 2 includes twice as many mask bits as in the circuit of FIG. 1. The N+M High Priority mask bits are represented by bits $M_{H,0}$ 208, $M_{H,1}$ 210, and . . . $M_{H,N+M-1}$ 212.

Control and enablement of the interrupt sources may be provided by any appropriate control logic. Control logic in the illustrated example uses AND gates 126 in conjunction with OR gates 230. The OR gates 230 of FIG. 2 may have twice as many inputs as the OR gates 130 of FIG. 1, because each interrupt source (as shown) is coupled to both interrupt request connections H_int 128 and L_int 130. Of course, there is no need to provide control bits for each and every interrupt source connection that enable selectable interrupt priority. Rather, in some alternatives only a portion of the interrupt source connections are enabled to have selectable interrupt priority.

Depending upon details of a computer system employing such dual-priority input sources, it may be perfectly acceptable to permit both High and Low Priority masks to be concurrently enabled for a particular interrupt source. Such a system might, for example, respond first to a high priority interrupt, and clear both mask bits, upon initiating execution of the ISR. Thus, the enabling of both the High and Low Priority interrupts would, in some systems, be equivalent to enabling the High Priority interrupt only. Even for extensions into a multiplicity of different priority levels, in some systems, more than one level of priority may be permitted concurrently. Enabling a plurality of priority levels may, as one example, be equivalent to enabling the highest of the enabled priority levels. Thus, in some system designs, it may be permissible to concurrently enable any particular combination of interrupt priority levels.

However, in other system designs it may be useful to preclude the enablement of more than one concurrent priority level for a particular interrupt source. Such a preclusion function may be implemented in software. As one example, software that sets bits in the interrupt masks may be configured to set only one bit at a time for any particular interrupt source, and to first clear all other mask bits for that particular source.

Figure 3:
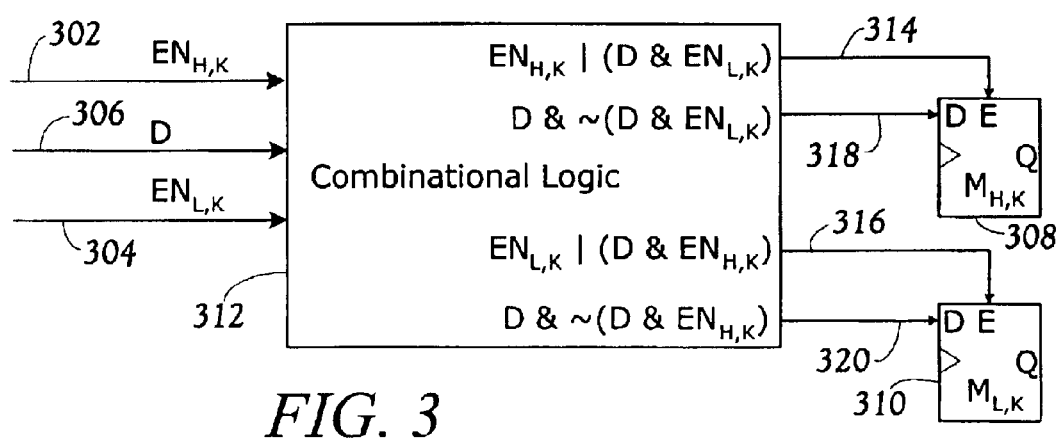
FIG. 3 is a simplified block schematic diagram of hardware logic circuit to prevent concurrent enablement of incompatible priority interrupts.

Such a function to preclude concurrently enabling incompatible interrupt priority levels may also be implemented in hardware. FIG. 3 illustrates one manner in which this function may be accomplished in hardware. As illustrated in FIG. 3, the High and Low Priority mask bits, $M_{H,K}$ and $M_{L,K}$, are not written directly to the registers from the data and address bus. Rather, the write enable for a high priority mask bit K is decoded as a signal $EN_{H,K}$ 302, and the analogous write enable signal for writing a Low Priority mask bit is similarly decoded as $EN_{L,K}$ 304. The interrupt enable bit, generally asserted via the data bus, is indicated as D 306. These three signals, associated with some particular interrupt source, are processed by a Combinational Logic block 312 to exclusively enable a Low Priority, a High Priority, or neither priority of interrupt service. For a particular interrupt source K, the combinational logic of Block 312 causes the high priority mask bit $M_{H,K}$ in register 308 to be set mutually exclusively with the low priority mask bit $M_{L,K}$ in register 310. Any appropriate logic may be employed to effect the desired mutual exclusivity.

As shown in FIG. 3, the High Priority mask bit $M_{H,K}$ may be set in register 308 as a result of data equal to D & ~(D & $EN_{L,K}$) clocked in by a clock signal $EN_{H,K}$ |(D & $EN_{L,K}$). Similarly, the Low Priority mask bit $M_{L,K}$ may be set in register 310 as a result of data equal to D & ~(D & $EN_{H,K}$) clocked in by a clock signal $EN_{L,K}$|(D & $EN_{H,K}$). This is one manner in which the simultaneous enabling of interrupts at more than one priority level may be precluded. The skilled person in the computer design arts shall understand that many alternatives are possible, and will readily be able to establish satisfactory combinational logic for the Block 312 to effect the function shown.

Systems may utilize a multiplicity of levels of interrupt priority. While the rules governing processor response to a particular level of interrupt priority may be as complicated as desired, in a simple case each higher level of interrupt will interrupt the microprocessor program, and will also interrupt any ISR running on a lower level of interrupt. The interrupt approach described above may be extended to systems with multiple levels of interrupt priority, irrespective of the number of priority levels provided, and irrespective of the logic by which different levels of priority are processed by the processor.

Figure 4:
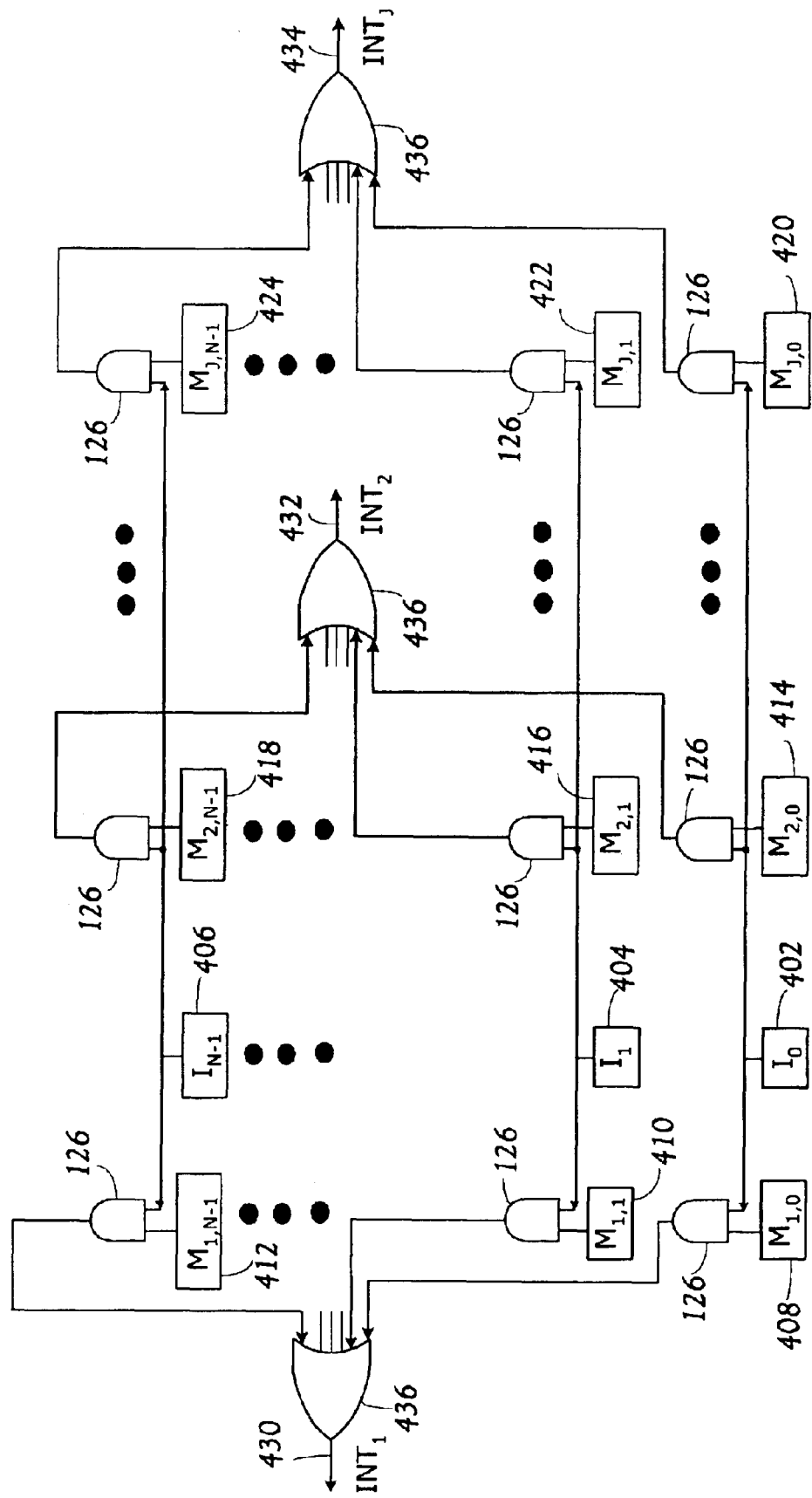
FIG. 4 is a block schematic diagram of selectable priority interrupts in a system having a multiplicity of different priority interrupts.

FIG. 4 illustrates an example in which J different priority level interrupt request connections are provided, as represented by $INT_1$ 430, $INT_2$ 432, and $INT_J$ 434. In this example, N interrupt source connections are provided, as represented by $I_0$ 402, $I_1$ 404, and $IN_{-1}$ 406. As an example of one manner in which control bits may be provided that permit each interrupt source to be selectively enabled to couple an interrupt request signal to any one of the J different priority level interrupt request connections, a separate interrupt mask bit is provided for each interrupt source $I_K$ at each of the J priority levels, for a total number of mask bits equal to the product of N times J. The mask bits are represented in the form $M_{A,B}$, wherein A is the interrupt priority index (ranging from 1 to J), and B is the interrupt source index (ranging from 0 to N−1). Thus, $M_{1,0}$ 408, $M_{1,1}$ 410 and $M_{1,N-1}$ 412 represent mask bits which, when set, enable the corresponding interrupt source $I_0$ 402, $I_1$ 404, or $I_{N-1}$ 406 to be coupled to the first priority interrupt request connection $INT_1$, 430. Any suitable hardware logic may be employed for this purpose.

In FIG. 4, the coupling is effected by means of AND gates 126 and an OR gate 436, similarly as in the circuit of FIG. 2. Similar hardware logic is provided to couple interrupts from one of the interrupt sources $I_K$ to the second priority interrupt request connection $INT_2$ 432. An appropriate mask bit, as represented by $M_{2,0}$ 414, $M_{2,1}$ 416 and $M_{2,N-1}$ 418, may be set to enable such coupling. For the Jth priority interrupt request connection $INT_J$ 434, coupling is similarly enabled by an appropriate mask bit, represented by $M_{J,0}$ 420, $M_{J,1}$ 422 and $M_{J,N-1}$ 424.

Of course, FIG. 4 represents a general case, and in some embodiments a selected portion of interrupt sources $I_K$ will be enabled to be coupled only to a selected portion of the J priority interrupt request connections of the computer. An example of an alternative to the case illustrated in FIG. 4 is now described, in which some interrupt sources do not have selectable priority, some have priority that may be selected from less than all of the available interrupt request priorities, and some have priority that is selectable to be any one of the available interrupt request priorities. Consider a system having N interrupt source connections $I_0$ to $I_{N-1}$ and J different priority interrupt request connections $INT_1$, to $INT_J$ where N is greater than J. First, some of the interrupt source connections may not be selectable. For example, each interrupt source $I_1$ to $I_J$ may be given a fixed priority by being able to be coupled (if an appropriate mask bit is enabled) to only a single priority interrupt request connection. In particular, $I_1$ may be coupled only to $INT_1$, $I_2$ only to $INT_2$, and so on, until finally $I_J$ may be coupled only to $INT_J$. Next, a group of interrupt sources beyond $I_J$, namely $I_{J+1}, I_{J+2}, \ldots, I_{N-1}$, may be enabled to be selectably coupled to any one of the J priority interrupt request connections (as is the case for all of the interrupt sources as shown in FIG. 4). Finally, $I_0$ may be enabled to be selectively coupled to a subset of the J available priority interrupt request connections, for example to $INT_1$, $INT_3$, $INT_5$ and $INT_J$. The foregoing example suggests the wide variety of ways in which some interrupt sources can be given limited priority selectability, others can be given maximum priority selectability, and yet others can be given a fixed priority.

Numerous techniques may be employed to enable a set of control bits associated with a particular interrupt source $I_K$ to cause that particular source to be selectively coupled to the priority interrupt request connections, and (if desired) to avoid conflicts such as concurrently coupling an interrupt source to incompatible interrupt request connections. An example of a software-based technique for these purposes includes configuring the software that is used to set and clear the control bits of each interrupt source (e.g., mask bits), whereby whenever an interrupt source is to be coupled to an interrupt request connection, all but the appropriate one of the set of control bits (e.g., mask bits) associated with the interrupt source are cleared while the appropriate bit is being set.

Figure 5:
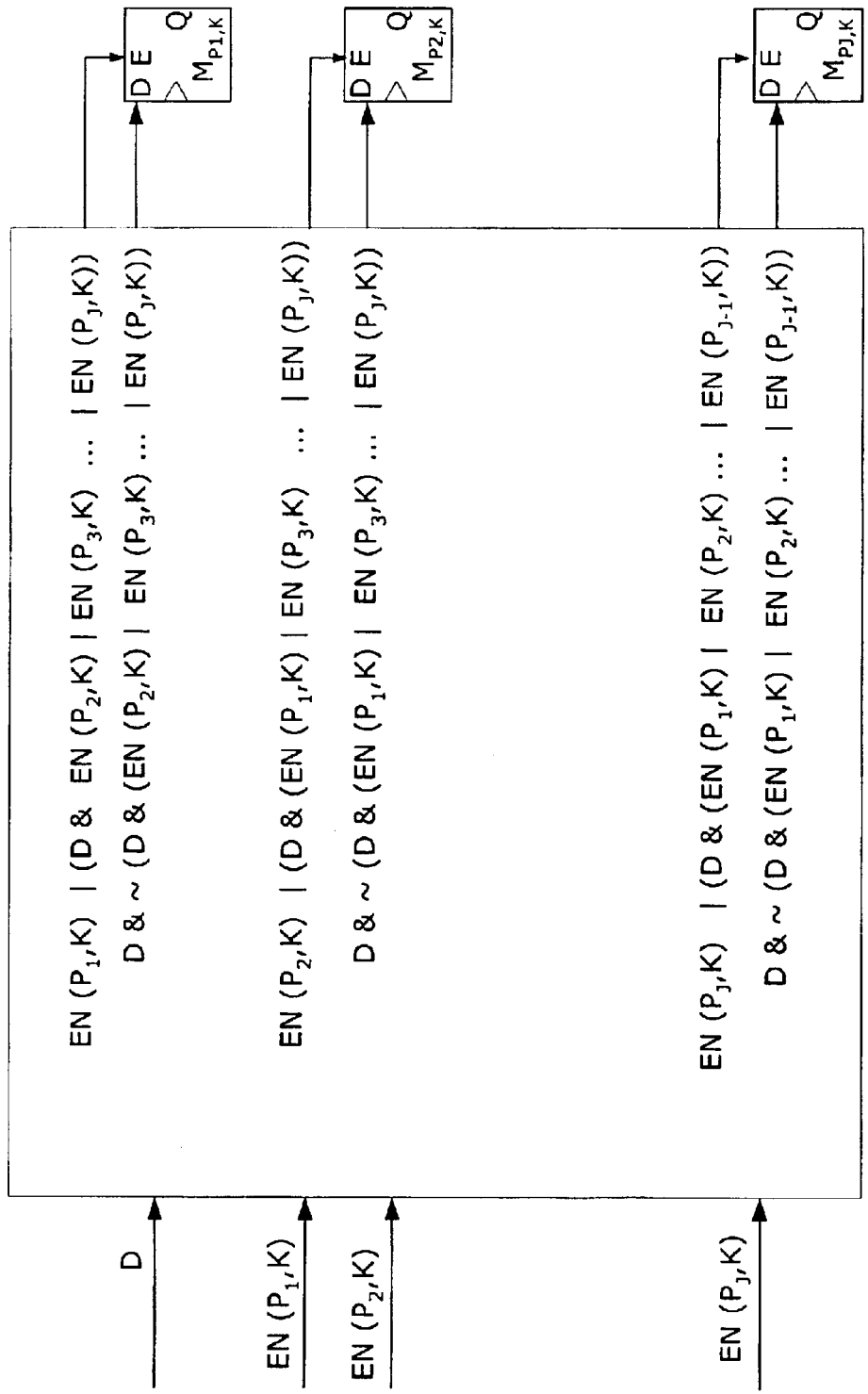
FIG. 5 is a block schematic diagram extending the circuit of FIG. 3 for use with the circuit of FIG. 4.

FIG. 5 is a block schematic diagram of a hardware technique that may be used with the circuit shown in FIG. 4 to preclude concurrently coupling an interrupt source $I_K$ to incompatible priority interrupt request connections. FIG. 5 is self-explanatory as a straightforward extension of the hardware technique described above with respect to FIG. 3.

Generally, a set of control bits associated with an interrupt source $I_K$ need not include a separate bit for each selectable priority interrupt request connection. For example, instead of an individual enable bit for each of the J priority interrupts, as illustrated in FIG. 4, the requisite set of control bits for $I_K$ may consist of the bits of a multiple-bit binary number. The multiple-bit binary number may be decoded in hardware such that no possible value will concurrently couple $I_K$ to incompatible interrupt request connections. In a simple version of this exemplary technique, the binary number (control bits) associated with $I_K$ may enable $I_K$ to be coupled to a group of one or more compatible priority interrupt request connection(s) which corresponds to the numerical value of the binary number. Thus, for example, the binary number "1001" may be decoded to cause interrupts on $I_K$ to be coupled to $INT_9$. As an alternative example, the binary number "1001" may be decoded to cause $I_K$ to be coupled to both $INT_3$ and $INT_5$, presuming those are compatible. At least one value, such as "0000," may be reserved as a null state to disable coupling to any priority interrupt request connection. Thus, when the control bits corresponding to a particular interrupt source are set to such null state, all interrupts from the source will be ignored by the processor. In the foregoing manner, a four-bit binary number may constitute control bits that are sufficient to selectively couple $I_K$ to one of up to fifteen different priority interrupt request connections, and also (in a null state) to disable any coupling at all, while also precluding concurrent coupling of the associated interrupt source $I_K$ to incompatible priority interrupt request connections.

Embodiments of the invention are described above, but the invention is not limited only to those embodiments. It is contemplated that any or all of the exemplary elements of the described embodiments may be replaced by elements that are different from, but equivalent to, the exemplary elements described, and each functional combination of such described elements and/or equivalent elements is considered to be an alternative embodiment of the invention. Thus, each functional combination of elements described above, and of the equivalents of such elements, is contemplated as an embodiment of the invention, excepting of course those combinations that merely constitute examples of the prior art. In view of the difficulties of precision in language, and of the impossibility of explicitly disclosing the entire multitude of ways in which the invention may be embodied, the invention is not to be defined except by the language of the appended claims that are specially provided for such purpose.

What is claimed is:

1. A method of providing a selectable priority level to computer interrupt source connections, comprising:
   a) servicing interrupts asserted at a first interrupt request connection according to a first interrupt priority;
   b) servicing interrupts asserted at a different second interrupt request connection at a different second interrupt priority;

c) providing one or more interrupt request control bits, corresponding to a particular interrupt source connection, having a state that is selectable under software control; and d) responding to an assertion of an interrupt request at the particular interrupt request source connection in accordance with the state of the corresponding interrupt request control bits by
   i) asserting an interrupt request at the first interrupt request connection if the corresponding interrupt request control bits are in a first state during assertion of the interrupt request at the particular interrupt request connection, and
   ii) asserting an interrupt request at the second interrupt request connection if the corresponding interrupt request control bits are in a different second state during assertion of the interrupt request at the particular interrupt request connection.

2. The method of claim 1, wherein step (c) comprises providing a separate mask bit associated with the particular interrupt request source for enabling each selectable priority level of interrupt.

3. The method of claim 2, wherein step (c) comprises providing logic that precludes setting the mask bits associated with a particular interrupt request source in a condition to concurrently enable a plurality of different priority level interrupts.

4. The method of claim 1, further comprising (e) servicing interrupts asserted at a different third interrupt request connection at a different third interrupt priority.

5. The method of claim 4, wherein step (d) further comprises (iii) asserting an interrupt request at the third interrupt request connection if the corresponding interrupt request control bits are in a different third state during assertion of the interrupt request at the particular interrupt request connection.

6. The method of claim 1, further comprising
   e) providing a multiplicity of interrupt source connections, and
   f) providing a set of one or more interrupt request control bits corresponding to each of the multiplicity of interrupt source connections, each set of interrupt request control bits having a state that is selectable under software control.

7. The method of claim 6, further comprising
   g) servicing interrupts asserted at a multiplicity of different interrupt request connections according to a corresponding multiplicity of interrupt priority levels; and
   h) coupling each interrupt source connection to a corresponding interrupt request connection as indicated by the state of the associated control bits.

8. The method of claim 7, wherein the set of control bits associated with each of the multiplicity of interrupt source connections is software configurable to couple an interrupt on the interrupt source connection to any one or none of the multiplicity of different interrupt request connections.

9. The method of claim 8, wherein step (c) comprises providing a separate mask bit for each interrupt request connection in each set of control bits.

10. Computer apparatus for providing an interrupt source input having a selectable priority level, the apparatus comprising:
   a) a first interrupt request connection configured to cause an interrupt service routine at a first priority level to be initiated when the first request connection is presented with an appropriate interrupt request signal;
   b) a second interrupt request connection configured to cause an interrupt service routine at a different second priority level when presented with an appropriate interrupt request signal;
   c) an interrupt source connection for accepting interrupt request signals from a particular interrupt source;
   d) one or more control bits associated with the interrupt source connection; and
   e) logic configured to couple an interrupt asserted on the interrupt source connection to the first interrupt request connection when the associated control bits are in a first state, and to the second interrupt request connection when the associated control bits are in a different second state.

11. The apparatus of claim 10, further comprising
   f) a plurality of interrupt source connections; and
   g) a different set of one or more interrupt control bits associated with each different interrupt source connection.

12. The apparatus of claim 11, wherein each set of interrupt control bits is configurable in a plurality of different states, including a first state in which the associated interrupt source connection is coupled with the first interrupt request connection, and a second state in which the associated interrupt source connection is coupled with the second interrupt request connection.

13. The apparatus of claim 12, wherein each set of interrupt control bits comprises an interrupt request mask bit for each interrupt request connection that is selectable for the associated interrupt source connection.

14. The apparatus of claim 10, further comprising logic configured to preclude setting the interrupt control bits in a state in which the associated interrupt source connection is coupled with a plurality of different interrupt request connections.

15. The apparatus of claim 10, further comprising at least a third interrupt request connection configured to cause an interrupt service routine at a different third priority level when presented with an appropriate interrupt request signal.

16. The apparatus of claim 15, further comprising a multiplicity of interrupt source connections and a corresponding multiplicity of sets of associated control bits, each set of associated control bits being configurable to selectively couple the associated interrupt source connection to any one of the interrupt request connections.

17. A method of providing a selectable priority level to interrupt source connections of a computer, comprising:
   a) providing a multiplicity of interrupt source connections to a computer;
   b) configuring the computer to
      i) accept interrupt requests coupled to any one of a multiplicity of different priority interrupt request connections, and to
      ii) respond to each interrupt request coupled to any particular interrupt request connection by initiating an Interrupt Service Routine at a level of priority corresponding to the particular interrupt request connection;
   c) providing a set of interrupt request control bits corresponding to each of the multiplicity of interrupt source connections, each set of interrupt control bits having a multiplicity of possible states corresponding to the multiplicity of different priority interrupt request connections, the state of at least one set of control bits being selectable under software control to correspond to any selected one of the multiplicity of different priority interrupt request connections; and d) responding to an interrupt request asserted at any particular interrupt source connection by coupling the interrupt request to a selected interrupt request connection corresponding to the state of the control bits corresponding to such interrupt source connection.

18. The method of claim 17, further comprising (e) providing at least one null state for each set of control bits that is selectable under software control and corresponds to none of the multiplicity of interrupt request connections, such that when the control bits associated with any particular interrupt source are set to such null state interrupt requests asserted by the particular interrupt source are ignored.

19. The method of claim 18, wherein each set of control bits includes a separate mask bit corresponding to each of the multiplicity of interrupt request connections.

20. The method of claim 19, further comprising controlling the state of the control bits associated with a particular interrupt source by means of hardware logic configured to preclude interrupts asserted by the particular interrupt source from being concurrently coupled to incompatible interrupt connections.

* * * * *